United States Patent [19]

Krikor

[11] Patent Number: 4,527,157
[45] Date of Patent: Jul. 2, 1985

[54] SINGLE FAULT TOLERANT CCIS DATA LINK ARRANGEMENT

[75] Inventor: Krikor A. Krikor, Glendale, Ariz.

[73] Assignee: GTE Automatic Electric Inc., Northlake, Ill.

[21] Appl. No.: 429,742

[22] Filed: Sep. 30, 1982

[51] Int. Cl.³ .................. H04Q 11/04; G06F 15/16
[52] U.S. Cl. .................. 340/825.01; 340/825.16; 340/825.57; 371/66; 370/16; 179/175.35
[58] Field of Search .............. 340/825.01, 825.16, 340/825.57; 179/175.2 C, 175.3 S; 370/16; 371/8, 66

[56] References Cited

U.S. PATENT DOCUMENTS 4,228,496 10/1980 Katzman et al. ............. 371/66
4,245,342 1/1981 Entenman ..................... 370/16
4,455,645 6/1984 Mijioka et al. ............. 340/825.01

Primary Examiner—Donald J. Yusko
Attorney, Agent, or Firm—Frank J. Bogacz; Peter Xiarhos

[57] ABSTRACT

The present invention is a power zoning arrangement for a common channel interoffice signaling system. For small switching offices a minimal hardware configuration is provided for CCIS data transfer while maintaining a single fault tolerant system.

5 Claims, 5 Drawing Figures

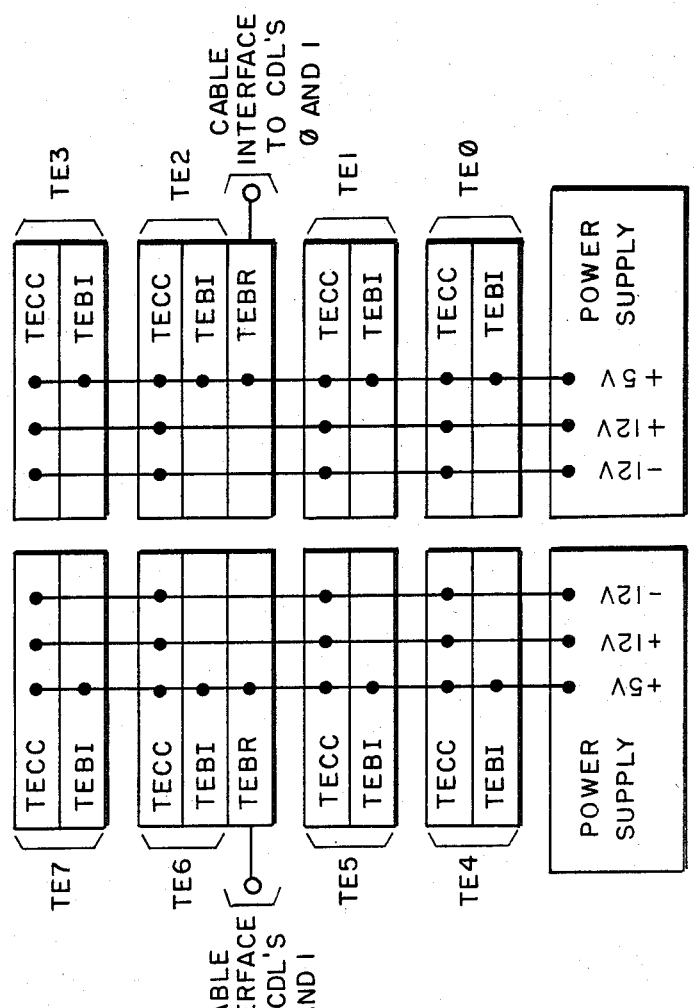
FIG. 4
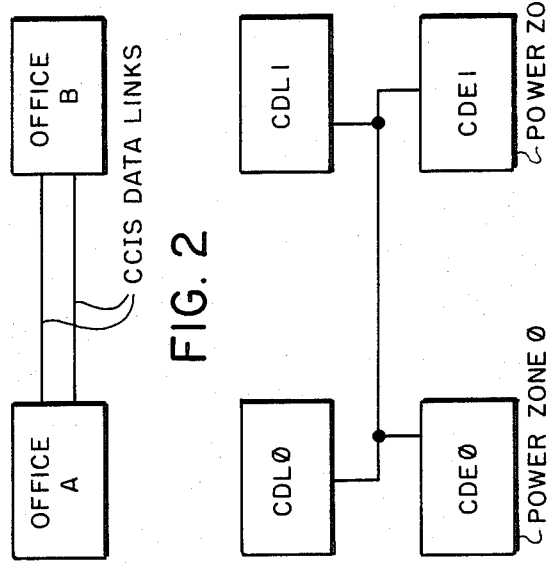
FIG. 2
FIG. 3A
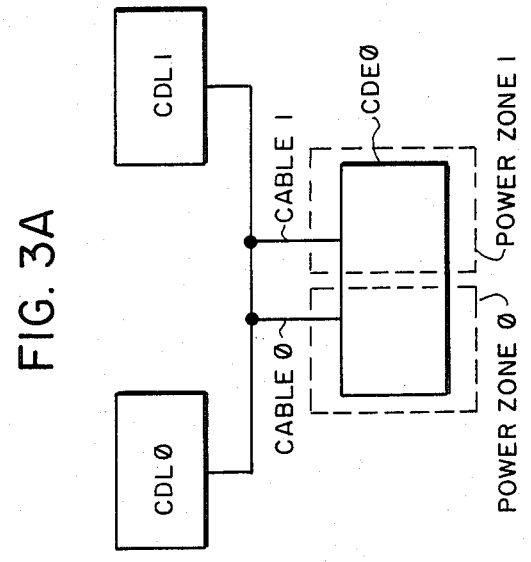
FIG. 3B

4,527,157

SINGLE FAULT TOLERANT CCIS DATA LINK ARRANGEMENT

BACKGROUND OF THE INVENTION

The present invention pertains to the interconnection of switching offices for Common Channel Interoffice Signaling (CCIS) and more particularly to a single fault tolerant arrangement for CCIS printed wiring cards.

In present day electronic switching offices, a large percentage of the faults of printed wiring cards (PWCs) occur in the printed wiring cards, which provide power to other functional electronic printed wiring cards. Single faults in electronic PWCs, of a non-power supply nature, provide a less frequent source of faults. Switching offices have a reliability requirement due to the public policy of providing telephone service 24 hours a day on an uninterrupted basis.

A CCIS system is a switching office signaling arrangement connected between two offices for removing supervision and control signaling from voice trunks and transmitting this signaling between the switching offices via data links. As a result, more efficient use is made of the voice trunks. Each data link may control data transmission for 1000 to 2000 trunks. So, a single power failure may result in the loss of use of up to 2000 trunks. Some CCIS systems operate each particular data link with a separate power supply. This is a reliable configuration, but uneconomical approach.

An economical solution to this problem has been to provide a redundant pair of data link equipment which are powered separately. In this configuration, each power supply powers a large number of data link equipment. This is a viable solution, but not a reliable one because a single power supply failure may result in the loss of use of a large number of CCIS data links.

Therefore, it is the object of the present invention to provide an economical and reliable single fault tolerant CCIS data link arrangement for smaller switching offices.

SUMMARY OF THE INVENTION

The present invention pertains to a CCIS data transmission system between at least two switching offices. The CCIS data system connects these switching offices for transmitting the supervisory signals required for a CCIS system. This system provides for a fault tolerant CCIS data link arrangement.

Each of the switching offices has a CPU arrangement connected to two distinct groups of terminal equipment. Each group of terminal equipment can include such devices as data link, controllers, modems or T1 spans and digital trunk units. These data links transfer data between each of the switching offices. These switching offices are connected by two of the data links, one from each group.

Each group of terminal equipment is connected to a corresponding power generator which provides a number of different voltages for each of the terminal equipment of its corresponding group. Each power generator is connected to its corresponding plurality of terminal equipment via a corresponding power bus. These voltages are supplied by each power generator to its corresponding group of terminal equipment via a corresponding power bus arrangement. As a result, each group of terminal equipment with its corresponding power supply and bus form an arrangement which is power independent of the other arrangement. Each of the power generators is connected to and operated from a commercial source of power with a battery backup for failure of the commercial source.

Typically, CCIS data is transferred between the two switching offices via data links which interconnect the two offices. It is required that the two switching offices be connected via at least two data links which reside in two different terminal equipment groups.

For the occurrence of a malfunction in the power generator, the corresponding power bus, the terminal equipment which connects two particular offices or the connection between the CPU arrangement and the terminal equipment, the CPU arrangement will operate the data link in the other terminal equipment group which connects these two offices to transfer all CCIS data between these offices. The operation of one data link, to transfer all CCIS data between the switching offices, will occur when either of the data links malfunction.

As a result, a minimum hardware configuration may be provided which is economical for smaller switching offices.

DESCRIPTION OF THE DRAWINGS

FIG. 2 is a block diagram of a CCIS interconnection of two switching offices each having a CCIS system as shown n FIG. 1.

FIG. 3A is a block diagram of a CCIS system for a large switching office.

FIG. 3B is a block diagram of a CCIS system for a smaller switching office.

FIG. 4 is a schematic diagram depicting the arrangement of the printed wiring cards comprising a single unit of terminal equipment as shown in FIG. 3B.

DESCRIPTION OF THE PREFERRED EMBODIMENT

Figure 1:
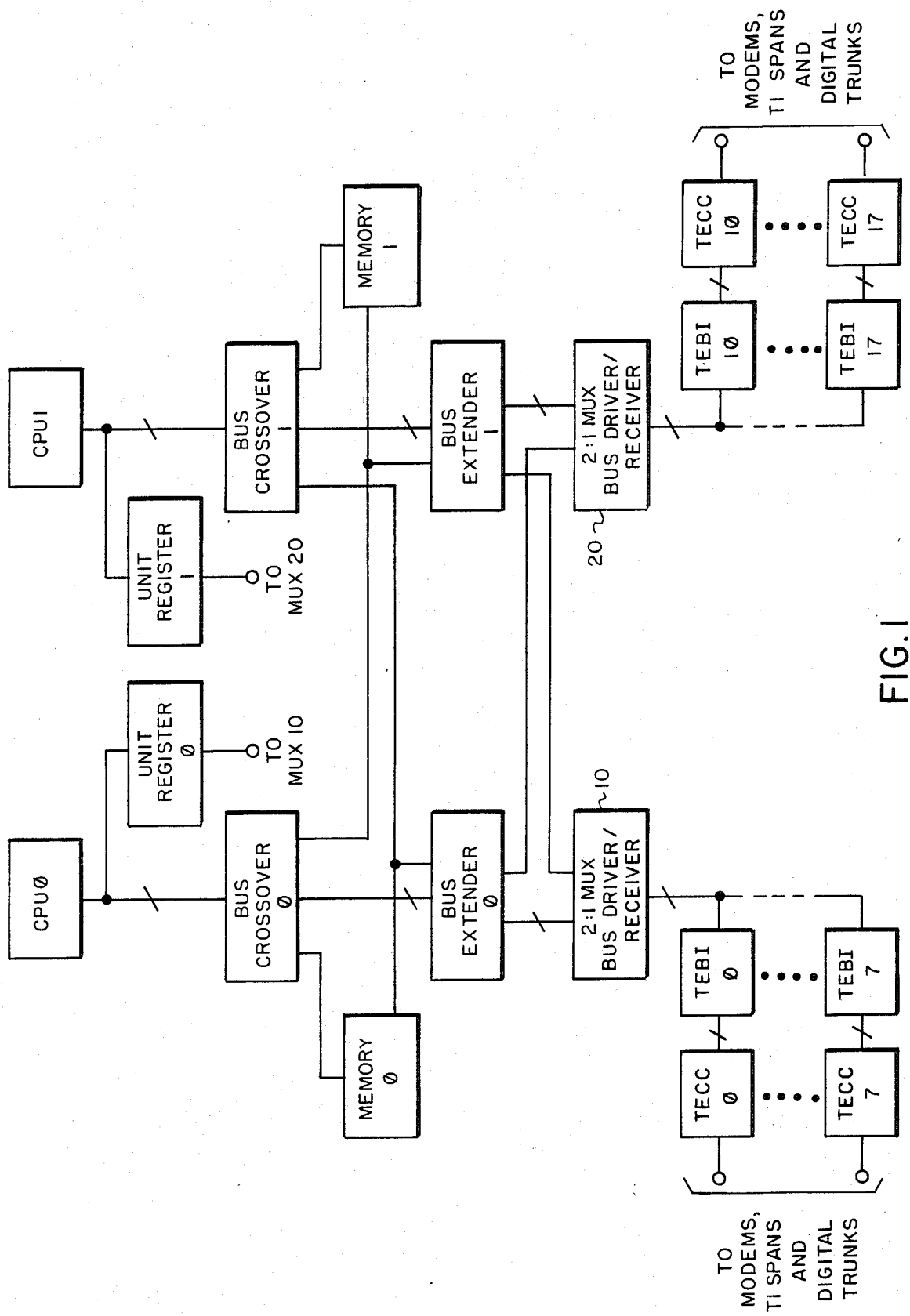
FIG. 1 is a block diagram of the CCIS system embodying the principles of operation of the present invention.

FIG. 1 is a block diagram of the CCIS system of the present invention. The CCIS system is distributed in at least two switching offices. Each office is controlled by two data link controllers (CDLs). Each CDL includes a CPU, CDL0 including CPU0 and CDL1 including CPU1. CPU0 and CPU1 are interconnected via bus cross-overs 0 and 1. The CPUs are operated in an active-ready standby configuration. That is, one CPU actively functions and the other is ready to be placed into service should a malfunction in the active unit occur. Each CPU is connected to a corresponding memory.

The bus cross-overs permit CPU0 to access memory 1, should a fault in memory 0 exist and vice-versa. Each bus cross-over is connected to a corresponding bus extender and connected to the bus extender of the other CPU. The bus extenders provide the appropriate drive for transmission of the CPU's data, address and control buses. Each CPU is connected to a corresponding unit register. That is, CPU0 is connected to a unit register 0 and CPU1 is connected to unit register 1. Unit registers 0 and 1 are respectively connected to multiplexers 10 and 20. Each combination of a CPU, a unit register, a bus cross-over, a memory and a bus extender constitutes a data link control module (CDL).

Each multiplexer is connected to a group of terminal equipment. Multiplexers 10 and 20 are each connected to CPUs 0 and 1. Each multiplexer permits the active CPU to access any of the plurality of terminal equipment printed wiring cards to which it is connected.

Each multiplexer is implemented on two printed wiring cards, each card termed a terminal equipment bus receiver (TEBR). There may be up to eight distinct units of terminal equipment in each group. The configuration of a multiplexer and terminal equipment is termed a data link terminal equipment interface module (CDE). FIG. 1 depicts a CCIS configuration for larger switching offices. The present invention employs a single CDE module for smaller switching offices.

Each TEBR is connected to four terminal equipment bus interface (TEBI) printed wiring cards. Each TEBI card is connected to a corresponding terminal equipment control circuit (TECC) printed wiring card. The TEBI and TECC card combinations provide the necessary interface to data links, modems or digital trunks and T1 spans. Each combination of two TEBRs, eight TEBIs and eight TECCs constitutes a CDE module. Each CDL and CDE module is a basic manufacturing unit. That is, it is a modular unit which is interconnected in a predetermined fashion.

The CPUs of each CDL may be implemented with an Intel 8086 microprocessor or similar device. Intel is a registered trademark of the Intel Corporation. The duplication of CDL units and their respective CPUs provide a fault tolerant arrangement for the control circuitry. A malfunction in the active CPU causes the ready standby CPU to become active and to assume all the data transfer functions.

FIG. 2 depicts the interconnection of two typical switching offices A and B. These offices are interconnected via two CCIS data links. If one of these data links malfunctions, the other data link would assume the transmission of the CCIS between offices A and B.

If both data links are powered by a single power supply, a single power fault in either office A or B would remove both data links from service and thereby render the CCIS system ineffective.

FIG. 3A depicts a typical configuration of data link control (CDL) modules and data terminal equipment interface (CDE) modules. CDL0 and 1 are each connected to their corresponding CDE0 and to CDE1. The plurality of terminal equipment comprising CDE0 forms one power zone and the terminal equipment of CDE1 forms a second power zone. The two data links connecting offices A and B, as shown in FIG. 2, would be selected so that one data link would reside in CDE0 and the other data link would reside in CDE1. This would provide a fault tolerant system for a power supply circuitry failure.

FIG. 3B depicts a CCIS configuration for a smaller switching office. For the smaller switching offices, one CDE manufacturing unit can be saved by dividing the power supply of particular CDE into two equal halves as shown. CDL0 is connected to the terminal equipment of power zones 0 and 1 of CDE0 via cables 0 and 1 respectively. CDL1 is connected to the terminal equipment of power zones 0 and 1 of CDE0 via cables 0 and 1 respectively. This configuration provides the same single fault tolerant feature for smaller switching offices as does the configuration shown in FIG. 3A for larger offices.

FIG. 4 depicts the printed wiring card layout of a single CDE module as shown in FIG. 3B with appropriate power busing connections. Each of the two power supplies is connected to a commercial source of power with a battery backup for failure of the commercial source. Each power supply produces three distinct voltage levels: +5 volts, +12 volts and −12 volts.

There are four terminal equipments contained in each power zone, equipments TE0 through TE3 comprise a first power zone and equipments TE4 through TE7 comprise a second power zone. Each terminal equipment contains a TEBI and a TECC printed wiring card. Together these two cards cooperate to perform the interface functions between the active CPU and a data link, modem or T1 span and digital trunk. The TEBR printed wiring card provides the multiplexing functions mentioned above.

Referring to FIGS. 2 and 4, offices A and B would be connected via two CCIS data links, one from each power zone. For example, offices A and B would be connected by the data link served by terminal equipment TE0 and the data link served by terminal equipment TE4. As a result, for a power supply failure of equipment TE4, the data link served by terminal equipment TE0 would transfer all data between offices A and B. Similarly, for a power supply failure of terminal equipment TE0, terminal equipment TE4 would assume all data transfer between offices A and B. As a result, a single power failure will not result in removal of the CCIS service between offices A and B.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a CCIS data transmission system including first and second switching offices connected via said system, a fault tolerant CCIS data link arrangement comprising:
   each said switching office including:
      CPU means;
      first and second pluralities of terminal equipment connected to said CPU means including respective pluralities of first and second data links for transferring data;
      said CPU means including:
         first and second CPUs; a first cable connection from said first plurality of terminal equipment to said first and second CPUs; a second cable connection from said second plurality of terminal equipment to said first and second CPUs; first and second CPU buses corresponding to said first and second CPUs respectively; first and second bus cross-overs corresponding to said first and second CPUs, each cross-over connected to said corresponding CPU via said corresponding CPU bus and to said other CPU via said other CPU bus, for connecting said first CPU to said second CPU bus and for connecting said second CPU to said first CPU bus; corresponding first and second memories connected to each corresponding bus cross-over; corresponding first and second bus extenders connected to each said bus cross-over and to each said memory; and said first and second CPUs being interconnected via said CPU buses and said bus cross-overs whereby said first CPU is active and said second CPU functions as a ready standby or alternatively said second CPU is active and said first CPU functions as a ready standby;
   each said switching office further including:

said first and said second switching offices connected via at least one of said first and one of said second data links;

each plurality of said terminal equipment connected to said CPU means and operated to transfer data between said first and second offices;

first and second multiplexer units, each multiplexer unit connected to said first and second CPUs via said corresponding CPU buses, each said multiplexer unit operated to connect any one of said pluralities of terminal equipment with said active CPU;

first and second registers connected between said first and second CPUs and said corresponding multiplexers and each register operated to selectively enable said active CPU to be connected to specific ones of said pluralities of terminal equipment for transmitting data from any of said pluralities of terminal equipment to said active CPU via said corresponding CPU bus;

first and second power generation means corresponding to said first and second pluralities of terminal equipment and each said power generation means operated to provide a plurality of distinct voltage levels to said corresponding plurality of terminal equipment;

first and second power buses connected between said first and second pluralities of terminal equipment and said corresponding first and second power generation means respectively, said power buses operated in response to said first and second power generation means to transmit said voltage levels from said first and second power generation means to said first and second pluralities of terminal equipment respectively;

said CPU means of said first switching office operated to transfer said data through one of said first and one of second plurality of data links to said second switching office and said CPU means of said second switching office operated to transfer said data through one of said first and one of said second plurality of data links to said first switching office; and said CPU means of each of said switching offices operated to select one of said first data links to transfer all said data between first and second switching offices for a malfunction of said second power generation means or alternatively said CPU means of each of said switching offices operated to select one of said second data links to transfer all said data between said first and second switching offices for a malfunction of said first power generation means.

2. A CCIS data link arrangement as claimed in claim 1, wherein each of said pluralities of terminal equipment further includes:

a cable interface printed wiring card connected to said first and second CPUs via said first and second cable connections; and a plurality of printed wiring card groups, each of said plurality connected between a corresponding data link of said plurality and said cable interface printed wiring card, each said printed wiring card group including:

a bus interface printed wiring card connected to said cable interface printed wiring card; and a control circuit printed wiring card connected between said bus interface printed wiring card and a corresponding data link.

3. A CCIS data link arrangement as claimed in claim 2, wherein:

said first power generation means is connected to said cable interface printed wiring cards, to each of said bus interface printed wiring cards and to each of said control circuit printed wiring cards of said first plurality via said first power bus; and said second power generation means is connected to said cable interface printed wiring card, to each of said bus interface printed cards and to each of said control circuit printed wiring cards of said second plurality via said second power bus.

4. A CCIS data link arrangement as claimed in claim 3, wherein said first and second power generation means each includes:

a power supply printed wiring card for generating said plurality of voltage levels; and a connection from said power supply printed wiring card to a commercial power source.

5. A CCIS data link arrangement as claimed in claim 4, wherein:

each power supply printed wiring card is connected to a predetermined number of printed wiring card groups for the transmission of said plurality of voltage levels to each said printed wiring card groups.

* * * * *